Patented Jan. 10, 1939

2,143,021

UNITED STATES PATENT OFFICE 2,143,021

REACTION OF ALPHA - HALOGENATED ETHERS WITH OLEFINES IN THE PRESENCE OF TITANIUM HALIDE CATALYSTS

Elmore Louis Martin, Wilmington, Del., assignor to E. I. du Pont de Nemours & Company, Wilmington, Del., a corporation of Delaware No Drawing. Application September 29, 1937, Serial No. 166,434

16 Claims. (Cl. 260—611)

This invention relates to a process of reacting halogenated ethers with olefine hydrocarbons to produce halogenated ethers of higher molecular weight and more particularly to catalysts therefor.

Scott in U. S. Patent 2,024,749 and Straus in U. S. Patents 2,075,312 and 2,075,313 disclose the addition of halogenated ethers to olefine hydrocarbons.

This invention has as an object the provision of a new catalyst and an improved process for the addition of halogenated ethers to olefines. Other objects will appear hereinafter.

These objects are accomplished by the following invention wherein an olefine is added to an alpha chlorinated or brominated ether under the catalytic influence of titanium tetrachloride or tetrabromide.

The more detail practice of the invention is illustrated by the following examples, wherein parts given are by weight unless otherwise stated. There are of course many forms of the invention other than these specific embodiments.

EXAMPLE I

*Monochloromethyl ether and isobutylene*

Through a mixture of 16.7 parts by weight of monochloromethyl ether and 1 part by weight of titanium tetrachloride cooled in an ice-bath and protected from atmospheric moisture was passed a slow stream of dry isobutylene. The reaction mixture was stirred vigorously during the addition of the olefine hydrocarbon. After 21 parts by weight of isobutylene had been absorbed, the mixture was allowed to stand at 0° for sixteen hours and then it was poured into ice-water and shaken thoroughly to remove the titanium tetrachloride from the non-aqueous layer. The reaction product was separated, dried over anhydrous calcium chloride and fractionated through an eight-inch Widner column at atmospheric pressure, B. P. 135–137°; yield, 17.3 parts by weight (61 per cent of the theoretical amount).

EXAMPLE II

*"Stenyl"-monochloromethyl ether and cyclohexene*

"Stenol", which is obtained by carboxylic reduction and saturation of sperm oil, is a mixture composed of the following alcohols in approximately the amounts indicated:

| Carbon atoms | 10 | 12 | 14 | 16 | 18 | 20 | 22 |
|---|---|---|---|---|---|---|---|
| Percent | 1.01 | 4.52 | 12.33 | 26.38 | 42.23 | 13.13 | 0.40 |

The use of the word "Stenol" hereafter in this application refers to this mixture of alcohols and "Stenyl" to the mixture of alkyl radicals thereof.

The monochloromethyl ether of "Stenol" was prepared as follows: Thirty parts of paraformaldehyde, 284 parts of "Stenol" and ½ part of potassium hydroxide were mixed and heated at 80° C. until a homogeneous solution was obtained. The cooled (25° C.) mixture was then saturated with dry hydrogen chloride. The water formed in the reaction formed a separate layer which was rejected. The "Stenyl"-monochloromethyl ether was purified by distillation.

To a mixture of 40.5 parts by weight of "Stenyl"-monochloromethyl ether (boiling range 178–194 at 0.5 mm.) and 1 part by weight of titanium tetrachloride was added gradually 16.7 parts by weight of cyclohexene, the temperature being maintained at 25–30° by occasional cooling. The light-brown reaction mixture was protected from atmospheric moisture and allowed to stand at room temperature for eighteen hours, then poured into ice-water and the mixture extracted with petroleum ether (B. P. 30–75°).

The petroleum ether solution was treated with decolorizing charcoal. On evaporation of the petroleum ether at room temperature a crude form of 1-"Stenyl"-oxymethyl-2-chlorocyclohexane was obtained. Distillation under reduced pressure gave 29.3 parts by weight of 1-"Stenyl"-oxymethylcyclohexene-1 of boiling range of 255–260° at 6 mm. It is a semisolid at room temperature and is only slightly soluble in methyl alcohol, easily soluble in benzene, ether, and petroleum ether.

EXAMPLE III

*Cetyl chloromethyl ether and cyclohexene*

Cetyl chloromethyl ether was prepared as follows: thirty parts of paraformaldehyde, 242 parts of cetyl alcohol, and ½ part of potassium hydroxide were mixed and heated at 80° C. until a homogeneous solution was obtained. The cooled (25° C.) mixture was then saturated with dry hydrogen chloride. The water produced in the reaction formed a separate layer which was rejected. The cetyl monochloromethyl ether was purified by distillation.

Sixteen and seven-tenths (16.7) parts of cyclohexene was added gradually to a mixture of 36 parts of cetyl chloromethyl ether and 1 part of titanium tetrachloride. The temperature was maintained at 25–30° C. by cooling. The reaction mixture, protected from atmospheric moisture was allowed to stand at room temperature for eighteen hours. It was then dissolved in petroleum ether and the resulting solution washed with water.

On evaporation of the petroleum ether a crude form of 1-cetoxymethyl-2-chlorocyclohexane was obtained. This, on distillation, lost hydrogen chloride to form cetoxymethylcyclohexene-1. Cetoxymethylcyclohexene-1 is a solid at room temperature and is only slightly soluble in methyl alcohol, easily soluble in benzene, ether, and petroleum ether.

In place of the olefines of the examples, any organic compound containing an ethylenic linkage may be used, e. g., ethylene, propylene, 2-methylbutylene-2, 2,3-dimethylbutylene-2, cyclopentene, 1,2- and 1,4-dihydronaphthalenes, butadiene, isoprene, trimethylethylene, 1,2-dihydrobenzene, amylene, vinylacetylene, divinylacetylene, methyl-2-butene-1-yne-3, dimethyl-1,2-butene-1-yne-3, 5-methyl-1, 5-hexadiene-3-yne, etc.

Compounds in which the unsaturation is ethylenic only are preferred since the reaction with compounds containing both ethylenic and acetylenic unsaturation may be complicated with polymerization difficulties.

Because of their ease and convenience of reaction, olefines of at least four carbon atoms are preferred.

Any alpha chlorinated or brominated ether, i. e., a chlorine or bromine atom on the carbon which bears the ether oxygen may be employed in the process of the present invention. Thus any alpha-halogenated ether of the type $R^1$-O-CHX$R^2$ wherein $R^1$ and $R^2$ are alkyl groups, aromatic groups, saturated alicyclic groups, or alkyl groups carrying either a saturated alicyclic group or an aromatic group or both, and $R^2$ may also be a hydrogen atom, and X is either a bromine or chlorine atom may be used in place of the alpha-halogenated ethers of the examples. Likewise any alpha, alpha'-dihalogenated ether of the type $R^2$CHX-O-CHX$R^2$ may be used in place of the alpha-halogenated ethers of the examples, $R^2$ and X being as stated above, and the two $R^2$'s being the same or different. Therefore in addition to the alpha-halogenated ethers of the examples, the following may be used: alpha-monochloroethyl ether, chloromethyl dodecyl ether, alpha-monochlorododecyl ether, alpha-chlorobenzylmethyl ether, alpha-chlorocinnamyl ethyl ether, symmetrical dichloromethyl ether, chloromethyl isopropyl ether, methyl alpha chloroethyl ether, chloromethyl chloroethyl ether, alpha, beta-dichloroethyl ethyl ether, chloromethyl propyl ether, alpha chloroethyl amyl ether, alpha chloroethyl dodecyl ether, chloromethyl octadecyl ether, chloromethyl cyclohexyl ether, chloromethyl benzyl ether, alpha chloroethyl phenyl ether, and 1-chloro-1,2-epoxycyclohexane.

Titanium tetrabromide may be used in place of titanium tetrachloride in general in the process of the present invention.

The reaction may be carried out in the presence of, or in the absence of a solvent. The solvent may be ethyl ether, propyl ether, isopropyl ether, butyl ether or in general any solvent for the reactants which is inert to the reactants. It need not be a solvent for the final product. In general equimolar quantities of the reactants may be used although other proportions are within the scope of the present invention.

The experimental conditions, as temperature, pressure and reaction time are determined by the nature of the mono-olefine. Easily polymerizable olefines, e. g., isobutylene, give better yields at temperatures near 0° C., whereas olefines not easily polymerized, as ethylene and propylene, require slightly higher temperatures if the reaction is to proceed at a measurable rate. Olefines easily liquefied at 0° C. or above, as isobutylene, amylene and cyclohexene, react at atmospheric pressure whereas olefines boiling at low temperatures, as ethylene and propylene, react more satisfactorily under superatmospheric pressure.

The process of the present invention affords considerable advantages over those of the prior art in that the yields by the present process are markedly increased by the use of the titanium tetrachloride or tetra bromide catalyst as exemplified by the increased yields given by titanium tetrachloride as compared with bismuth trichloride at the same catalyst concentration. The yield of the methyl ether of 3-chloro-3-methylbutanol-1 from monochloromethyl ether and isobutylene was 60% with titanium tetrachloride as compared with 23% with bismuth trichloride. The yield in the addition of other monochloromethyl ethers to unsaturated compounds is increased in a similar fashion by the use of titanium tetrachloride. Titanium tetrachloride has been found to be an excellent catalyst for the addition of long chain chloromethyl ethers such as dodecyl chloromethyl ether, cetyl chloromethyl ether, etc., to cyclohexene. These products are of special interest as intermediates for the synthesis of surface active products.

The above description and examples are intended to be illustrative only. Any modification of or variation therefrom which conforms to the spirit of the invention is intended to be included within the scope of the claims.

I claim:

1. Process which comprises bringing 21 parts by weight of isobutylene in contact at 0° C. with a mixture of 16.7 parts by weight of monochloromethyl ether and one part by weight of titanium tetrachloride.

2. Process which comprises reacting isobutylene with monochloromethyl ether in the presence of titanium tetrachloride.

3. Process which comprises reacting an olefine of at least four carbon atoms with an alpha chlorinated ether in the presence of titanium tetrachloride.

4. Process which comprises reacting an olefine containing ethylenic unsaturation only of at least four carbon atoms with an alpha chlorinated ether in the presence of titanium tetrachloride.

5. Process which comprises reacting an olefine with an alpha chlorinated ether in the presence of titanium tetrachloride.

6. Process which comprises reacting an olefine containing ethylenic unsaturation only with an alpha chlorinated ether in the presence of titanium tetrachloride.

7. Process which comprises reacting an olefine with an alpha chlorinated ether in the presence of a titanium halide catalyst of the class consisting of titanium tetrachloride and titanium tetrabromide.

8. Process which comprises reacting an olefine containing ethylenic unsaturation only with an alpha chlorinated ether in the presence of a titanium halide catalyst of the class consisting of titanium tetrachloride and titanium tetrabromide.

9. Process which comprises reacting an olefine of at least four carbon atoms with an alpha halogenated ether of the class consisting of alpha brominated and alpha chlorinated ethers in the presence of titanium tetrachloride.

10. Process which comprises reacting an olefine containing ethylenic unsaturation only of at least four carbon atoms with an alpha halogenated ether of the class consisting of alpha brominated and alpha chlorinated ethers in the presence of titanium tetrachloride.

11. Process which comprises reacting an olefine with an alpha halogenated ether of the class consisting of alpha brominated and alpha chlorinated ethers in the presence of titanium tetrachloride.

12. Process which comprises reacting an olefine containing ethylenic unsaturation only with an alpha halogenated ether of the class consisting of alpha brominated and alpha chlorinated ethers in the presence of a titanium halide catalyst of the class consisting of titanium tetrachloride and titanium tetrabromide.

13. Process which comprises reacting an olefine with an alpha halogenated ether of the class consisting of alpha brominated and alpha chlorinated ethers in the presence of a titanium halide catalyst of the class consisting of titanium tetrachloride and titanium tetrabromide.

14. Process which comprises reacting an olefine containing ethylenic unsaturation only with an alpha halogenated ether of the class consisting of alpha brominated and alpha chlorinated ethers in the presence of a titanium halide catalyst of the class consisting of titanium tetrachloride and titanium tetrabromide.

15. Process which comprises reacting cyclohexene in the presence of titanium tetrachloride with the monochloromethyl ether of the mixture of alcohols obtained by the carboxylic reduction and saturation of sperm oil.

16. Process which comprises reacting cyclohexene with cetyl monochloromethyl ether in the presence of titanium tetrachloride.

ELMORE LOUIS MARTIN.